United States Patent Office 3,364,108
Patented Jan. 16, 1968

3,364,108
PESTICIDAL NICOTINE ALKALOID SALTS OF DITHIOCARBAZIC OR DITHIOCARBAMIC ACIDS
Sashichiro Nakanishi, Tokyo, and Hiroshi Kuyama, Saitama-ken, Japan, assignors to Tokyo Yuki Kagaku Kogyo Kabushiki Kaisha, Tokyo, Japan
No Drawing. Continuation-in-part of abandoned application Ser. No. 347,045, Feb. 24, 1964. This application Nov. 19, 1965, Ser. No. 508,830
Claims priority, application Japan, Mar. 5, 1963, 38/11,346
6 Claims. (Cl. 167—34)

ABSTRACT OF THE DISCLOSURE

Compounds useful as fungicide, bactericide, antivirus agent, insecticidal agent, nematicide and herbicide comprising nicotinic alkaloid salts of (a) polythiocarbamic acid, N-dialkyl dithiocarbamic acid, N-mono-alkyl-dithiocarbamic acid, N-mono-phenyl-dithiocarbamic acid or dithiocarbazic acid, or mixtures thereof, wherein each alkyl group has 1 to 3 carbon atoms; with (b) a nicotinic alkaloid selected from the group consisting of nicotine, neonicotine and anabasine.

---

This application is a continuation-in-part of our copending application Ser. No. 347,045, filed Feb. 24, 1964, now abandoned.

An object of this invention is to provide new compositions which have fungicidal, bactericidal, antivirus, ovicidal, insecticidal, nematicidal and herbicidal activities, which give plants resistance to disease, and which have an accelerating effect on metabolism, and which also have pesticidal action on fishes.

Another object of this invention is to provide useful pesticides containing a new chemical compound as an active ingredient.

The pesticides of the present invention are characterized by containing, as active ingredient, at least one of nicotinic alkaloid salt selected from the group consisting of dithiocarbamic acid, dithiocarbazic acid such as polydithiocarbamic acid exemplified by alkylene bisdithiocarbamic acid and di-lower alkyl dithiocarbamic acid exemplified by dimethyl dithiocarbamic acid and mono-lower alkyl dithiocarbamic acid exemplified by mono-methyl dithiocarbamic acid and dithiocarbazic acid. When needed, other salts of the above-mentioned dithiocarbamic acid and/or carbazic acid excepting alkaloid salt, the other alkaloid salts excepting abovementioned acid salt or free alkaloid, or other kinds of active ingredient may be added.

First of all the active components of the agent of this invention shall be explained. All of the above-mentioned active components are new compounds. Suitable dithiocarbamic acid of this invention are as follows.

Among useful polydithiocarbamic acid, there are alkylene bisdithiocarbamate such as ethylene-bis-dithiocarbamate, polyalkylene polydithiocarbamate derived from polyalkylene polyamide, for example, diethylenetriamine-bis-dithiocarbamate and/or diethylenetriamine-tris-dithiocarbamate obtained from diethylenetriamine or polydithiocarbamate derived from triethylenetetramine and cyclic trimethylenetriamine, that is, methylenedithiocarbamate, alkyl methylenedithiocarbamate, these compounds indicated by following formulas:

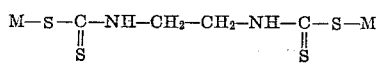

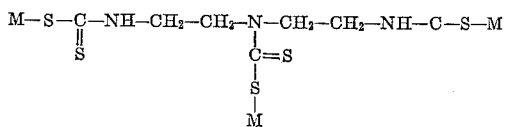

and the compound indicated by following formula:

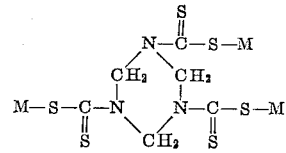

and

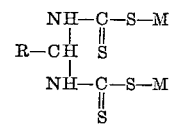

or its polymer, polydithiocarbamate containing aromatic nucleus such as phenylene bisdithiocarbamate and xylene bisdithiocarbamate and heterocyclic dithiocarbamate such as piperazine bisdithiocarbamate. Monomethyl dithiocarbamate is a typical example of mono-substituted dithiocarbamate. In this group, there are monoalkyl dithiocarbamate such as monoethyl and monopropyl dithiocarbamate and aromatic mono-substituted dithiocarbamate such as phenyl dithiocarbamate. Dithiocarbazic acid derived from hydrazine and phenyl dithiocarbazic acid are the typical of dithiocarbazate. As nicotinic alkaloid, nicotine is the typical example, and it has the following formula

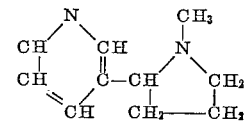

As further nicotinic alkaloids, there are neonicotine, anabasine, and the like. Neonicotine and anabasine have the same structure as shown in the following:

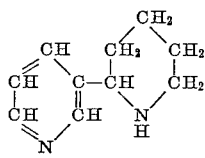

Anabasine is contained in a weed, belonging to the genus of sugar-beet (*Anabasis aphylla*), and optically active, while neonicotine is optically inactive. Commercially they are sold as neonicotine as contaminated with dipyridyl and pyridyl piperidine, etc., and both of them may be employed as the salt component of the agents of the present invention.

The activity and characteristic properties of the compositions of the present invention will be explained as follows. The compositions of this invention exhibit the high bactericidal, fungicidal, antiviral, insecticidal, nematicidal, herbicidal, and ovicidal activities at the same time, and moreover, give the treated plants the disease resistance.

Strongly basic alkaloids such as nicotine, neonicotine, anabasine and dithiocarbamic acid produce stable salts and can be stored for a long period. The usual insecticides, particularly chemically synthesized insecticides, sometimes have strong harmful effects (phytotoxicity) against host plants applied with them, and therefore careful consideration is needed for application of them. Nicotine anabasine itself is a component derived from some plants, and has been evaluated from old time as a safe insecticide with the lowest phytotoxicity. Water-soluble dithiocarbamate shows a same shock to plants. Therefore, in general, it is used in the form of insoluble salt such as zinc salt, and its fungicidal action is practically exhibited through its slight solubility. Out of water-soluble salts, ammonium salt is most unique at the point of giving the least shock to plants and showing pesticidal action after absorbed into plants. Amine salts show almost the same characteristics of ammonium salts. Ammonium salt and amine salt have a very high activity and therefore can be applied in lower concentration. And then, they are very economical since they show marked activity even in low concentration. In the case when high molecular amine salt such as nicotine, neonicotine anabasine is used, this shock effect becomes remarkably weakened, that is, it has no phytotoxicity. Moreover, the strong pesticidal effect of amine salt is retained; the chemicals of this invention are extremely useful. The characteristic of this chemical composition is to generate various activities at the same time. Thus, nicotine salts have strong insecticidal activity in addition to all kinds of the above-mentioned activities of dithiocarbamate and dithiocarbazate.

The research and development of the chemical compositions which show the many activities at the same time is now a matter of urgent necessity. The problems concerning agricultural chemicals will be discussed below.

The damages caused by fungi, bacteria, virus, nematodes, harmful insects and the like have been considered to occur separately, and therefore the pesticide of the single purpose has been considered separately for each damage. However, such a concept is not true, since fungi, bacteria and virus infect plants at the same time and make disease-complex develop. Soil-nematode also gives the damages in cooperation at the same time with bacteria and fungi. Virus, bacteria and fungi are carried by the harmful insects, and damages caused by them become spread. The pesticidal composition of this invention is most suitable for the purpose under such consideration. By the application of these chemicals, bactericidal, antiviral and nematocidal activities due to dithiocarbamate are synchronized with insecticidal activity due to nicotine, neonicotine, anabasine. The interesting effect of this composition is prevention and expulsion of virosis, virus-fungi-bacteria-mixed infection and insect pests. It seems that owing to fungicidal, bactericidal, and antiviral effects and strengthening effect to plant activity of dithiocarbamate, co-operated with preventing effect to insect-vectors of nicotine, neonicotine, anabasine, this composition exhibit such superiority.

Nicotine salt of monomethyl-dithiocarbamic acid can be quoted as chemical composition which shows an interesting effect. This salt is decomposable in the soil to form methylisothiocyanate, which diffuses into soil in a form of gas and shows a strong bactericidal, insecticidal, nematocidal and herbicidal activities. As to the nicotine salt, it appeared that fumigative nicotine also diffused into soil and showed splendid ovicidal activity and strong effect against molluscous insects and larval, and thus it exhibited combined effect.

And, the nicotine salt, neonicotine salt, anabasine salt of dithiocarbamic acid has specific character as follows. Ammonium salt and amine salt of dithiocarbamic acid are stable when pH of the system is more than 7 and can be stored for a long period. Nicotine salt, neonicotine salt, anabasine salt have the same properties as other amine salt and ammonium salts. Fortunately, nicotine, neonicotine, anabasine have better activity under this condition. Furthermore, nicotine, neonicotine, anabasine show stronger activity at combined state than nicotine, neonicotine, anabasine alone. This fact seems to be produced by the synergistic effects which is the same as well-known effect by potassium ion. In order to maintain the stability and activity of this chemical composition according to the present invention, it is preferable to add an adequate pH adjuster.

The carrier to be added to the active ingredients of the agents of the present invention is normally water, when they are water-soluble, while organic solvents such as alcohols, for example, methanol, ethanol, propanol, isopropanol, butanol, isobutanol, amylalcohol, ethylene glycol, glycerin; ketones, for example, acetone and methylethylketone; dimethylformamide and dimethylsulfoxide, etc., and solid carriers such as talc and clay may also be employed.

In manufacturing said chemical composition with said alkaloid salts of dithiocarbamic acids, it is able to be combined for not only such water-soluble salts of dithiocarbamic acids as general salts, ammonium salts, amine salts, sodium salts, potassium salts, magnesium salts, and quarternary ammonium salts, but also such water-insoluble salts and derivatives etc. as zinc salts, manganese salts, iron salts, nickel salts, copper salts, salts of more than two kinds of metals, thiurams, sulfenimide, metal-containing thiuram (methiram) compounds, complex salts of more than two metals and the like. While, free alkaloids and alkaloid salts can be combined with above-mentioned alkaloid salts of dithiocarbamic acids. This fact is very important in practical use. Namely, when one chemical composition has to have more than two kinds of action, a certain dilution-rate profitable for one activity is often unsuitable for the other activity. With accordance to the above-mentioned way, it is possible to decide the amount of these compounds in order to be suitable for both activities.

In general the present new compounds are prepared as follows:

Into a 4-necked flask, there are introduced 1–1.2 equivalent (2–2.4 equivalents in the case of diamine) of carbon bisulfide and 250–550 g. of water; 1 equivalent of amine is added dropwise from a tap funnel with agitation; at the reaction temperature from 40° to 45° C. the free acids are synthesized. At the later term of the synthesis of the free acids, 1 equivalent of nicotine extract (95% solution) is added. It is cooled after one-hour agitation at 40°–45° C. Excess of carbon bisulfide expelled off at 45°–50° C. After cooling, its pH is adjusted to 8.8–9.0 with gaseous ammonia.

EXAMPLARS

For the purpose of illustration, methods of synthesis and analysis for a few compounds are shown in the following.

EXAMPLE 1.—SYNTHESIS OF NICOTINE ETHYLENE-BISDITHIOCARBAMATE

Into a 4-necked flask, there are introduced 167 g. (2.2 mols) of carbon bisulfide and 540 g. of water; 106 g. (56%, 1 mol) of ethylenediamine is added dropwise from a tap funnel with agitation; at the reaction temperature from 40° to 45° C., there are provided an orange-yellow liquid containing white precipitates. Upon adding 341 g. of nicotine extract (95%, 1 mol) dropwise into the liquid, it turns to a brownish black, clear liquid. It is cooled after one hour agitation at 40°–45° C., excess of carbon bisulfide is expelled off at 45°–50° C. After cooling, its pH turns to about 7.8, therefore it is adjusted to 8.8–9.0 with gaseous ammonia. 1000 ml. of 45% product is obtained.

*Method of analysis*

(a) *Method of analysis for active ingredient.*—About 7.6 g. of sample is precisely weighed (W) and introduced into a 250 ml. measuring flask, and diluted with deionized water up to the marked line. After mixing thoroughly, 25 ml. of this solution is introduced into a decomposition flask with a whole pipette. The first absorption tube is filled with 25 ml. of 10% lead acetate solution, the second absorption tube with 25 ml. of 2 N methanolic potassium hydroxide solution. With both tubes being water-cooled and suction being regulated, 50 ml. of hot 1.1 N sulfuric acid from the top of the center tube and the content is intensely heated to be decomposed. Upon terminating heating after 1¼ hour period, methanolic potassium hydroxide solution is washed out with deionized water into a 500 ml. conical beaker and neutralized with 30% acetic acid employing phenolphthalein as an indicator, thence titrated with 1/10 N iodine solution, employing starch as an indicator.

$$\text{Percent of active ingredient} = \frac{I_{2(ml.)} \times F_{I_2} \times 26.7}{W}$$

(b) *Method of analysis for nicotine portion.*—A sample containing about 2 g. of nicotine is precisely weighed [1] into a 500 ml. round-bottomed distillation flask, and 20 ml. of water, 10 g. of NaCl and 10 ml. of natrium hydroxide (30%) are added, zeolite being introduced thereto, also. As a receiver, 1 liter measuring flask is employed, to which 10 ml. of diluted hydrochloric acid has been previously introduced, the tip point of cooling pipe being kept submerged in the solution only a bit. Upon connecting the distillation flask and the cooling pipe, steam distillation is started. Upon the start of distillation, the distillation flask is heated and the volume of the liquid is regulated. Distillation is continued and 1–2 ml. of distillate is taken into a test tube to test for cloud or turbidity by adding a drop of (1+4) diluted hydrochloric acid silicotungstic acid solution [2] and a drop of (1+4) diluted hydrochloric acid. After cloud has ceased to appear, the tip of cooling pipe is pulled out of the distillate and washed with deionized water, the washings being combined with the distillate and the distillation being terminated.[3] The residue in the distillation flask is certified for its alkalinity by adding phenolphthalein indicator. A portion of the distillate is taken to test for its acidity by adding methyl orange indicator, and 100 ml. of the distillate is transferred into a beaker with whole pipette, to which 3 ml. of (1+4) diluted hydrochloric acid is added, then while heating, silicotungstic acid solution being added. In order to grow crystals larger, heating with agitation and cooling are repeated several times, thereupon it is allowed to stand overnight at room temperature.

The precipitate is filtered with a quantitative filter paper and thoroughly washed with (1+4) diluted hydrochloric acid. After drying, the precipitate is transferred together with the filter paper into a crucible, the weight of which has been known, and ignited to constant weight.

Calculation:

$$\text{Percent of nicotine} = \frac{114.0 \times \text{residue}}{\text{sample (g.)}}$$

NICOTINE DIMETHYL-DITHIOCARBAMATE

Method of synthesis 84 g. (1.1 mols) of carbon bisulfide and 200 g. of water are introduced into a 4-necked flask, and 113 g. (40%, 1 mol) of diethylamine is added dropwise thereto with agitation from a tap funnel. After agitation of one hour since the completion of the addition, 170 g. of nicotine extract (95%, 1 mol) is added dropwise and the solution turns to a brownish black, clear liquid. Upon cooling after agitating for one hour at 40°–45° C., excess of carbon bisulfide is driven off at 45°–50° C. As the pH turns to about 7.8 after cooling, it is adjusted to 8.8–9.0 with gaseous ammonia. 500 ml. of about 47% product is obtained.

Method of analysis (a) *Method of analysis for active ingredient.*—About 7.6 g. of sample is precisely weighed and introduced into a 250 ml. measuring flask, and then diluted with deionized water up to the marked line. After mixing thoroughly, 25 ml. of this solution is introduced to a 125 ml. decomposition flask, and 25 ml. of 10% lead acetate solution is added to the first absorption tube and 25 ml. of 2 N methanolic potassium hydroxide solution to the second absorption tube, both of the tubes being water-cooled. Suction is regulated and from the top of the center tube, 50 ml. of 1.1 N hot sulfuric acid is introduced and the content is intensely heated to be decomposed. After a period of 1¼ hours, heating is terminated and at once the methanolic potassium hydroxide solution is washed out into a 500 ml. conical beaker with deionized water. After neutralizing with 30% acetic acid employing phenolphthalein as an indicator, titration is conducted with 1/10 N iodine solution, employing starch as an indicator.

$$\text{Percent of active ingredient} = \frac{I_{2(ml.)} \times F_{I_2} \times 28.24}{\text{Sample (g.)}}$$

(b) *Method of analysis for nicotine portion.*—The same as in the case of nicotine ethylene-bis-dithiocarbamate.

NICOTINE DITHIOCARBAZATE

Method of synthesis 84 g. of carbon bisulfide (1.1 mols) and 300 g. of water are introduced into a 4-necked flask and agitated. From a tap funnel, 100 g. of hydrazine hydrate (50%, 1 mol) is added dropwise and agitation for one hour at about 40° C. is conducted. Upon adding 170 g. of nicotine extract (95%, 1 mol), the solution turns to a brownish black, clear liquid. Excess of carbon bisulfide is driven off at 45°–50° C. and upon adjusting pH to 9.00, 600 ml. of 40% product is obtained.

Method of analysis (a) *Method of analysis for active ingredient.*—The same as in the case of nicotine ethylene-bis-dithiocarbamate, but the calculation may be done as follows:

$$\text{Percent of active ingredient} = \frac{I_{2(ml.)} \times F_{I_2} \times 26.90}{\text{Sample (g.)}}$$

(b) *Method of analysis for nicotine portion.*—The same as in the case of nicotine ethylene-bis-dithiocarbamate.

NICOTINE MONOMETHYL-DITHIOCARBAMATE

Method of synthesis

Into a 4-necked flask, there are introduced 84 g. (1.1 mol) of carbon bisulfide and 200 g. of water; 100 g. (30%, 1 mol) of monomethylamine is added dropwise from a tap funnel with agitation. After agitation of one hour since the completion of the addition, 170 g. of nicotine extract (95%, 1 mol) is added dropwise and the solution turns to a brownish black, clear liquid. Upon cooling after agitating for one hour at 40°–45° C., excess of carbon bisulfide is driven off at 45°–50° C. The pH is adjusted to 8.8–9.0 with gaseous ammonia. 500 ml. of about 48% product is obtained.

Method of analysis (a) *Method of analysis for active ingredient.*—The same as in the case of nicotine ethylene-bis-dithiocarbamate of the revised specification, but the calculation may be done as follows:

$$\text{Percent of active ingredient} = \frac{I_{2(ml.)} \times F_{I_2} \times 26.8}{\text{Sample (g.)}}$$

(b) *Method of analysis for nicotine portion.*—The same as in the case of nicotine ethylene-bis-dithiocarbamate.

---

[1] Sample is stored in a dropping bottle and weighed previously. A certain quantity of the sample to be required is introduced to a distillation flask, and the weight difference between before and after the transfer is determined as the weight of sample taken (g.).

[2] 120 g. of silicotungstic acid ($4H_2O \cdot SiO_2 \cdot 12WO_3 \cdot 22H_2O$) is dissolved in water and the solution is diluted to make one litre. There are several classes of silicotungstic acids, and because those having the compositions of $4H_2O \cdot SiO_2 \cdot 10WO_3 \cdot 3H_2O$ and $4H_2O \cdot SiO_2 \cdot 12WO_3 \cdot 2H_2O$, form no crystalline precipitate, they should not be used.

[3] Washing is conducted until no cloud appears upon adding a few drops of nicotine distillate to 2–3 ml. of fresh washings taken in a test tube.

NICOTINE DIETHYLENETRIAMINE-TRISDITHIOCARBAMATE

Method of synthesis

Into a 4-necked flask, there are introduced 252 g. (3.3 mols) of carbon bisulfide and 680 g. of water; 206 g. (50%, 1 mol) of diethylenetriamine is added dropwise from a tap funnel with agitation. After agitation of one hour since the completion of the addition, 510 g. (95%, 3 mol) of nicotine extract is added dropwise and the solution turns to a brownish black, clear liquid. Upon cooling after agitating for one hour at 40°–45° C., excess of carbon bisulfide is expelled off at 45°–50° C. The pH is adjusted to 8.8–9.0 with gaseous ammonia. 1550 ml. of about 49% product is obtained.

Method of analysis (a) *Method of analysis for active ingredient.*—The same as in the case of nicotine ethylene-bis-dithiocarbamate, but the calculation may be done as follows:

$$\text{Percent of active ingredient} = \frac{I_{2(ml.)} \times F_{I_2} \times 27.13}{\text{Sample (g.)}}$$

(b) *Method of analysis for nicotine portion.*—The same as in the case of nicotine ethylene-bisdithiocarbamate.

NICOTINE PHENYLENE-BISDITHIOCARBAMATE

Method of synthesis

Into a 4-necked flask, there are introduced 168 g. (2.2 mol) of carbon bisulfide and 600 g. of water; 108 g. (1 mol) of solid phenylene diamine is added slowly with agitation. After agitation of one hour since the completion of the addition, 341 g. of nicotine extract (95%, 2 mol) is added dropwise and the solution turns to a brownish black, clear liquid. Upon cooling after agitating for one hour at 40°–45° C., excess of carbon bisulfide is driven off at 45°–50° C. 1160 ml. of about 48% product is obtained.

Method of analysis (a) *Method of analysis for active ingredient.*—The same as in the case of nicotine ethylene-bisdithiocarbamate, but the calculation may be done as follows:

$$\text{Percent of active ingredient} = \frac{I_{2(ml.)} \times F_{I_2} \times 29.1}{\text{sample (g.)}}$$

(b) *Method of analysis for nicotine portion.*—The same as the case of nicotine ethylene-bisdithiocarbamate.

NICOTINE PHENYL-DITHIOCARBAMATE

Method of synthesis

Into a 4-necked flask, there are introduced 84 g. (1.1 mol) of carbon bisulfide and 250 g. of water; 93 g. (1 mol) of aniline is added dropwise with agitation. After agitation of one hour since the completion of the addition, 170 g. of nicotine extract (95%, 1 mol) is added dropwise and the solution turns to a brownish black, clear liquid. Upon cooling after agitating for one hour at 40°–45° C., excess of carbon bisulfide is expelled off at 45°–50° C. The pH is adjusted to 8.8–9.0 with gaseous ammonia. 470 ml. of about 47% product is obtained.

Method of analysis (a) *Method of analysis for active ingredient.*—The same as in the case of nicotine ethylene-bisdithiocarbamate, but the calculation may be done as follows:

$$\text{Percent of active ingredient} = \frac{I_{2(ml.)} \times F_{I_2} \times 33.0}{\text{sample (g.)}}$$

(b) *Method of analysis for nicotine portion.*—The same as in the case of nicotine ethylene-bisdithiocarbamate.

NICOTINE PIPERAZINE-BISDITHIOCARBAMATE

Method of synthesis

Into a 4-necked flask, there are introduced 167 g. (2.2 mol) of carbon bisulfide and 450 g. of water; 215 g. (40%, 1 mol) of piperazine is added dropwise from a funnel with agitation. After agitation of one hour since the completion of addition, 341 g. of nicotine extract (95%, 2 mol) is added dropwise and the solution turns to a brownish black, clear liquid. Upon cooling after agitating for one hour at 40°–45° C., excess of carbon bisulfide is driven off at 45°–50° C. The pH is adjusted to 8.8–9.0 with gaseous ammonia. 1120 ml. of about 48% product is obtained.

Method of analysis (a) *Method of analysis for active ingredient.*—The same as in the case of nicotine ethylene-bisdithiocarbamate, but the calculation may be done as follows:

$$\text{Percent of active ingredient} = \frac{I_{2(ml.)} \times F_{I_2} \times 28.0}{\text{sample (g.)}}$$

(b) *Method of analysis for nicotine portion.*—The same as in the case of nicotine ethylene-bisdithiocarbamate.

NEONICOTINE ETHYLENE-BIS-DITHIOCARBAMATE

Method of synthesis

Into a 4-necked flask, there are introduced 167 g. (2.2 mol) of carbon bisulfide and 50 g. of water; 106 g. (56%, 1 mol) of ethylenediamine is added dropwise from a tap funnel with agitation. After agitation of one hour since the completion of the addition, 1080 g. of neonicotine solution (30%, 2 mol) is added dropwise. Upon cooling after agitating for one hour at 40°–45° C., excess of carbon bisulfide is expelled off at 45°–50° C. The pH is adjusted to 8.8–9.0 with gaseous ammonia. 1380 ml. of about 38% product is obtained.

Method of analysis for active ingredient

The same as in the case of nicotine ethylene-bisdithiocarbamate.

NEONICOTINE DIMETHYL-DITHIOCABAMATE

Method of synthesis 84 g. (1.1 mol) of carbon bisulfide and 50 g. of water are introduced into a 4-necked flask and 113 g. (40%, 1 mol) of dimethylamine is added dropwise thereto with agitation from a tap funnel. After agitation of one hour since the completion of the addition, 540 g. of neonicotine solution (30%, 1 mol) is added dropwise. Upon cooling after agitating for one hour at 40°–45° C., excess of carbon bisulfide is expelled off at 45°–50° C. The pH is adjusted to 8.8–9.0 with gaseous ammonia. 550 ml. of about 32% product is obtained.

Method of analysis for active ingredient

The same as in the case of nicotine dimethyl-dithiocarbamate.

NEONICOTINE DITHIOCARBAZATE

Method of synthesis 84 g. of carbon bisulfide (1.1 mol) and 50 g. of water are introduced into a 4-necked flask and agitated. From a tap funnel, 100 g. of hydrazine hydrate (50%, 1 mol) is added dropwise and agitation for one hour at about 40° C. is conducted. Upon adding 540 g. of neonicotine solution (30%, 1 mol), the solution turns to a brownish black, clear liquid. Excess of carbon bisulfide is expelled off at 45°–50° C. and upon adjusting pH to 8.8–9.0, 760 ml. of 35% product is obtained.

Method of analysis for active ingredient

The same as in the case of nicotine dithiocarbazate.

NEONICOTINE MONOMETHYL-DITHIOCARBAMATE

Method of synthesis

Into a 4-necked flask, there are introduced 84 g. (1.1 mol) of carbon bisulfide and 50 g. of water; 100 g. (30%, 1 mol) of monomethylamine is added dropwise from a tap funnel with agitation; after agitation of one hour since the completion of the addition, 540 g. of neonicotine solution (30%, 1 mol) is added dropwise and the solution turns to a brownish black, clear liquid. Upon cooling after agitating for one hour at 40°–45° C., excess of carbon bisulfide is driven off at 45°–50° C. The pH is adjusted to 8.8–9.0 with gaseous ammonia. 750 ml. of 35% product is obtained.

Method of analysis for active ingredient

The same as in the case of nicotine monomethyl-dithiocarbamate.

NEONICOTINE DIETHYLENETRIAMINE-TRISDITHIOCARBAMATE

Method of synthesis

Into a 4-necked flask, there are introduced 252 g. (3.3 mol) of carbon bisulfide and 50 g. of water; 206 g. (50%, 1 mol) of diethylenetriamine is added dropwise from a tap funnel with agitation; after agitation of one hour since the completion of the addition, 1620 g. (30%, 3 mol) of neonicotine solution is added dropwise and the solutions turns to a brownish black, clear liquid. Upon cooling after agitating for one hour at 40°–45° C., excess of carbon bisulfide is driven off at 45°–50° C. The pH is adjusted to 8.8–9.0 with gaseous ammonia, 2090 ml. of about 38% product is obtained.

Method of analysis for active ingredient

The same as in the case of nicotine diethylenetriamine-trisdithiocarbamate.

NEONICOTINE PHENYLENE-BISDITHIOCARBAMATE

Method of synthesis

Into a 4-necked flask, there are introduced 168 g. (2.2 mol) of carbon bisulfide and 300 g. of water; 108 g. (1 mol) of solid phenylene diamine is added slowly with agitation; after agitation of one hour since the completion of the addition, 1080 g. of neonicotine solution (30%, 2 mol) is added dropwise and the solution turns to a brownish black, clear liquid. Upon cooling after agitating for one hour at 40°–45° C., excess of carbon bisulfide is driven off at 45°—50° C. The pH is adjusted to 8.8–9.0 with gaseous ammonia. 1630 ml. of about 35% product is obtained.

Method of analysis for active ingredient

The same as in the case of nicotine phenylene-bisdithiocarbamate.

NEONICOTINE PHENYL-DITHIOCARBAMATE

Method of synthesis

Into a 4-necked flask, there are introduced 84 g. (1.1 mol) of carbon bisulfide and 100 g. of water; 93 g. (1 mol) of aniline is added dropwise with agitation; after agitation of one hour since the completion of the addition, 540 g. of neonicotine solution (30%, 1 mol) is added dropwise and the solution turns to a brownish black, clear liquid. Upon cooling after agitating for one hour at 40°–45° C., excess of carbon bisulfide is driven off at 45°–50° C. The pH is adjusted to 8.8–9.0 with gaseous ammonia. 700 ml. of about 32% product is obtained.

Method of analysis

The same as in the case of nicotine phenyl-dithiocarbamate.

NEONICOTINE PIPERAZINE-BISDITHIOCARBAMATE

Method of synthesis

Into a 4-necked flask, there are introduced 167 g. (2.2 mol) of carbon bisulfide and 200 g. of water; 215 g. (40%, 1 mol) of piperazine solution is added dropwise from a tap funnel with agitation; after agitation of one hour since the completion of the addiition, 1080 g. of neonicotine solution (30%, 2 mol) is added dropwise and the solution turns to a brownish black, clear liquid. Upon cooling after agitating for one hour at 40°–45° C., excess of carbon bisulfide is driven off at 45°–50° C. The pH is adjusted to 8.8–9.0 with gaseous ammonia. 1640 ml. of about 34% product is obtained.

Method of analysis

The same as in the case of nicotine piperazine-bisdithiocarbamate.

NICOTINE DIETHYL-DITHIOCARBAMATE

Method of synthesis

Into a 4-necked flask, there are introduced 84 g. (1.1 mol) of carbon disulfide and 250 g. of water; 123 g. (40%, 1 mol) of diethylamine is added dropwise from a tap funnel with agitation; after agitation of one hour since the completion of the addition, 170 g. of nicotine extract (95%, 1 mol) is added dropwise and the solution turns to a brownish black, clear liquid. Upon cooling after agitating for one hour at 40°–45° C., excess of carbon bisulfide is driven off at 45°–50° C. The pH is adjusted to 8.8–9.0 with gaseous ammonia. 600 ml. of about 46% product is obtained.

Method of analysis (a) *Method of analysis for active ingredient.*—The same as in the case of nicotine ethylene-bisdithiocarbamate, but the calculation may be done as follows:

$$\text{Percent of active ingredient} = \frac{I_{2(ml.)} \times F_{I_2} \times 31.0}{\text{sample (g.)}}$$

(b) *Method of analysis for nicotine portion.*—The same as in the case of nicotine ethylene-bisdithiocarbamate.

NICOTINE MONOETHYL-DITHIOCARBAMATE

Into a 4-necked flask, there are introduced 84 g. (1.1 mol) of carbon bisulfide and 250 g. of water; 113 g. (40%, 1 mol) of monoethylamine is added dropwise from a tap funnel with agitation; after agitation of one hour since the completion of the addition, 170 g. of nicotine extract (95%, 1 mol) is added dropwise and the solution turns to a brownish black, clear liquid. Upon cooling after agitating for one hour at 40°–45° C., excess of carbon bisulfide is driven off at 45°–50° C. The pH is adjusted to 8.8–9.0 with gaseous ammonia. 600 ml. of about 46% product is obtained.

Method of analysis (α) *Method of analysis for active ingredient.*—The same as in the case of ethylene-bisdithiocarbamate, but the calculation may be done as follows:

$$\text{Percent of active ingredient} = \frac{I_{2(ml.)} \times F_{I_2} \times 28.3}{\text{sample (g.)}}$$

(b) *Method of analysis for nicotine portion.*—The same as in the case of nicotine ethylene-bisdithiocarbamate.

NICOTINE MONOPROPYL-DITHIOCARBAMATE

Method of synthesis

Into a 4-necked flask, there are introduced 84 g. (1.1 mol) of carbon bisulfide and 250 g. of water; 148 g. (40%, 1 mol) of monopropylamine is added dropwise from a tap funnel with agitation; after agitation for one hour since the completion of the addition, 170 g. of nicotine extract (95%, 1 mol) is added dropwise and the solution turns to a brownish black, clear liquid. Upon cooling after agitating for one hour at 40°–45° C., excess of carbon bisulfide is expelled off at 45°–50° C. The pH is adjusted to 8.8–9.0 with gaseous ammonia. 630 ml. of about 46% product is obtained.

Method of analysis (a) *Method of analysis for active ingredient.*—The same as in the case of nicotine ethylene-bisdithiocarbamate, but, the calculation may be done as follows:

$$\text{Percent of active ingredient} = \frac{I_{2(ml.)} \times F_{I_2} \times 29.7}{\text{sample (g.)}}$$

(b) *Method of analysis for nicotine portion.*—The same as in the case of nicotine ethylene-bisdithiocarbamate.

NICOTINE DIPROPYL-DITHIOCARBAMATE

Method of synthesis

Into a 4-necked flask, there are introduced 84 g. (1.1 mol) of carbon bisulfide and 300 g. of water; 253 g. (40%, 1 mol) of dipropylamine is added dropwise from a tap funnel with agitation; after agitation of one hour since the completion of the addition, 170 g. of nicotine extract (95%, 1 mol) is added dropwise and the solution turns to a brownish black, clear liquid. Upon cooling after agitating for one hour at 40°–45° C., excess of carbon bisulfide is driven off at 45°–50° C. The pH is adjusted to 8.8–9.0 with gaseous ammonia. 780 ml. of 42% product is obtained.

Method of analysis (a) *Method of analysis for active ingredient.*—The same as in the case of nicotine ethylene-bisdithiocarbamate, but, the calculation may be done as follows:

$$\text{Percent of active ingredient} = \frac{I_{2(ml.)} \times F_{I_2} \times 33.9}{\text{sample (g.)}}$$

(b) *Method of analysis for nicotine portion.*—The same as in the case of nicotine ethylene-bisdithiocarbamate.

EXAMPLE 2

Nicotine salt of ethylenebisdithiocarbamic acid was diluted with water to the solid matter by 1,000 times, 2,000 times, 5,000 times and 10,000 times. The eradicative activity upon *Ophiobolus miyabeanus, Alternaria kikuchiana, Xanthomona orygae, Xanthomona citri* and *Coli communis* was tested. With even 10,000 times solution, 100% of such microorganisms were killed. For aphides, lace bugs, thrips, radish webworms, rice stem borers, rice leaf miner, peach leaf miner, cabbage sawfly, red spider, and pear sucker were completely killed by 2,000 times solution and the activity was observed in the case of 5,000 times solution. The nematicidal action upon imagines and eggs of nematodes is strong.

EXAMPLE 3

The prevention and expulsion test of diseases and insects for the crysanthemum was carried out by the use of nicotine salts of ethylenebisdithiocarbamic acid, dimethyl dithiocarbamic acid and dithiocarbazic acid. The 2,000 times diluted solution of the above-mentioned compounds was sprayed over plants. The result of test showed that white rust and rust phillosticta spot could be controlled by the treatment, and that the damage by chrysanthemum aphid could be controlled at the same time.

EXAMPLE 4

The 2,000 times diluted solution of nicotine salt of ethylenebisdithiocarbamic acid was used for controlling tomato diseases. The prevention and expulsion of late blight and leaf mold were successed. Moreover, there could be completely controlled on the treated field the tomato disease caused by cucumber mosaic virus which appeared severely on the adjacent field.

EXAMPLE 5

The explusion test of soil-borne diseases, nematodes and other soil insects was carried out by means of injecting nicotine salt of monomethyldithiocarbamic acid into soil. In this test, 5 g. of the compound the water solution was injected into each one hole at intervals of 30 cm. and holes were closed after treatment and the treated soil was covered with plastic sheet. Among the cucumber, seedlings transplanted on the treated soil, there were no diseased plants affected by *Fusarium oxysporum, F. cucumerinum, Corticium rolfsii,* and *Pellicularia filamentosa.* And then damages of nematodes and Anomala spp. could be prevented. This treatment could also inhibit growth of weeds remarkably.

EXAMPLE 6

A series of tests for bacteriocidal, fungical and insecticidal activities of the following compounds was carried out. Each compound was applied after diluted with water to give the solution in the listed concentration.

(1) Nicotine ethylene-bisdithiocarbamate
(2) Nicotine dimethyl-dithiocarbamate
(3) Nicotine dithiocarbazate
(4) Nicotine diethylene-triamine-trisdithiocarbamate
(5) Nicotine phenylene-bisdithiocarbamate
(6) Nicotine phenyl-dithiocarbamate
(7) Nicotine piperazine-bisdithiocarbamate
(8) Nicotine monomethyl-dithiocarbamate For *Alternaria kikuchiana*, the lowest concentration of each chemicals inhibiting 95% of spore germination was determined after measuring percentage of spore germination on slide glass against diluted solutions of various concentrations, and for *Xanthomonas oryzae*, the lowest concentration of each chemicals sufficient to inhibit the bacterial growth on culture medium containing the chemicals of various concentrations after artificial inoculation of the bacteria. The results are indicated in the following table.

| Compound | X. oryzae (p.p.m.) | A. kikuchiana (p.p.m.) |
|---|---|---|
| (1) | 2 | 20–30 |
| (2) | 2 | 20–30 |
| (3) | 5 | 50–60 |
| (4) | 10 | 100 |
| (5) | 5 | 40–50 |
| (6) | 5 | 40–50 |
| (7) | 3 | 30–40 |
| (8) | 2 | 20–30 |

As to insecticidal activity, the chemicals of each selected concentration were compared with 800 times diluted aqueous solution of nicotine sulfate (containing 40% of free nicotine) added with 3 g. of sodium salts of fatty acids to 1 liter of diluted solution. The rate of killed insects were calculated after counting numbers of living green peach aphids on egg-plant leaves before and after the solutions sprayed with 3 cc. of alkyl-phenol-polyethylene oxide per 10 liter of them. The experimental results are indicated as follows:

| Compound | Dilution ratio to solid matter | Percent killed aphids |
|---|---|---|
| (1) | 1:1,000 | 97.5 |
| (2) | 1:1,000 | 99.5 |
| (3) | 1:1,000 | 98.5 |
| (4) | 1:1,000 | 97.5 |
| (5) | 1:800 | 96.5 |
| (6) | 1:800 | 97.0 |
| (7) | 1:1,000 | 98.5 |
| (8) | 1:1,000 | 99.5 |
| Nicotine sulfate (40% free nicotine) | 1:800 | 92.5 |

EXAMPLE 7

Bactericidal and insecticidal tests of the following compound were run. All of them were employed by dissolving them in water and diluting them to indicated concentrations. Neonicotine used was a commercial product.

A. Runs wherein nicotine salt or neonicotine salt of dithiocarbamic acids was used alone:

(1) Nicotine ethylene-bisdithiocarbamate
(2) Nicotine monomethyl-dithiocarbamate
(3) Nicotine dimethyl-dithiocarbamate
(4) Nicotine dithiocarbazate
(5) Nicotine diethylene-triamine-trisdithiocarbamate
(6) Nicotine phenylene-bisdithiocarbamate
(7) Nicotine phenyl-dithiocarbamate
(8) Nicotine piperazine-bisdithiocarbamate
(9) Neonicotine ethylene-bisdithiocarbamate
(10) Neonicotine monomethyl-dithiocarbamate
(11) Neonicotine dimethyl-dithiocarbamate
(12) Neonicotine dithiocarbazate
(13) Neonicotine diethylene-triamine-trisdithiocarbamate
(14) Neonicotine phenylene-bisdithiocarbamate
(15) Neonicotine phenyl-dithiocarbamate
(16) Neonicotine piperazine-bisdithiocarbamate B. Runs wherein mixtures of nicotine salts, neonicotine salts and other salts of dithiocarbamic acids were used.

(17) Nicotine ethylene-bisdithiocarbamate+ammonium dimethyl-dithiocarbamate
(18) Nicotine ethylene-bisdithiocarbamate+neonicotine dimethyl-dithiocarbamate
(19) Nicotine ethylene-bisdithiocarbamate+nicotine phenylene-bisdithiocarbamate
(20) Nicotine ethylene-bisdithiocarbamate+ammonium piperazine-bisdithiocarbamate
(21) Nicotine dimethyl-dithiocarbamate+sodium phenylene-bisdithiocarbamate
(22) Neonicotine monomethyl-dithiocarbamate+sodium phenyl-dithiocarbamate For control tests, the following compounds were used:

(23) Ammonium ethylene-bisdithiocarbamate
(24) Ammonium dimethyl-dithiocarbamate
(25) Sodium dithiocarbazate
(26) Ammonium diethyl-triamine-trisdithiocarbamate
(27) Ammonium phenyl-dithiocarbamate
(28) Ammonium piperazine-bisdithiocarbamate
(29) Sodium monomethyl-dithiocarbamate
(30) Ammonium phenylene-bisdithiocarbamate Against *Altanaria kikuchiana*, diluted solution of various concentration were prepared and slide glasses were used. Germination rates of spores were measured and minimum concentration to inhibit 95% of spores were determined. In the case of *Xanthomonas oryzae*, culture media containing those chemicals in various concentrations were prepared and inoculated with the strain to determine the minimum concentration to inhibit the growth. The results are as follows. Figures in parentheses show in p.p.m. the concentrations of dithiocarbamate portions only. In the cases of blends, where both of the ingredients were blended in 1:1 mol ratio, figures show the concentration in p.p.m. based on the total weights of the preparations, and those in parentheses show the concentration of total dithiocarbamate portions in p.p.m.

| Chemicals | Xanthomonas oryzae (p.p.m.) | Altanaria kikuchiana (p.p.m.) |
|---|---|---|
| Nicotine ethylene-bisdithiocarbamate | 2 (0.8) | 25 (9.8) |
| Ammonium ethylene-bisdithiocarbamate | 2 (1.7) | 26 (22.4) |
| Nicotine monomethyl-dithiocarbamate | 2 (0.8) | 25 (9.9) |
| Sodium monomethyl-dithiocarbamate | 3 (2.5) | 25 (20.5) |
| Nicotine dimethy-dithiocarbamate | 2 (0.8) | 25 (10.6) |
| Ammonium dimethyl-dithiocarbamate | 2 (1.8) | 26 (22.8) |
| Nicotine dithiocarbazate | 5 (2.0) | 45 (17.9) |
| Sodium dithiocarbazate | 5 (4.2) | 50 (41.5) |
| Nicotine diethylene-triamine-trisdithiocarbamate | 9 (3.6) | 80 (32.3) |
| Ammonium diethylene-triamine-trisdithiocarbamate | 9 (7.7) | 85 (73.7) |
| Nicotine phenylene-bisdithiocarbamate | 5 (2.2) | 38 (16.5) |
| Ammonium phenylene-bisdithiocarbamate | 5 (4.4) | 40 (35.1) |
| Nicotine phenyl-dithiocarbamate | 5 (2.5) | 45 (22.9) |
| Ammonium phenyl-dithiocarbamate | 5 (4.5) | 45 (40.9) |
| Nicotine piperazine-bisdithiocarbamate | 3 (1.3) | 35 (14.7) |
| Ammonium piperazine-bisdithiocarbamate | 4 (3.5) | 35 (30.6) |
| Neonicotine ethylene-bisdithiocarbamate | 2 (0.8) | 25 (9.8) |
| Ammonium ethylene-bisdithiocarbamate | 2 (1.7) | 26 (22.4) |
| Neonicotine monomethyl-dithiocarbamate | 3 (0.8) | 24 (9.9) |
| Sodium monomethyl-dithiocarbamate | 3 (2.5) | 25 (20.5) |
| Neonicotine dimethyl-dithiocarbamate | 2 (0.9) | 25 (10.6) |
| Ammonium dimethyl-dithiocarbamate | 2 (1.8) | 26 (22.8) |
| Neonicotine dithiocarbazate | 5 (2.3) | 45 (17.9) |
| Sodium dithiocarbazate | 5 (4.2) | 50 (41.5) |
| Neonicotine diethylene-triamine-trisdithiocarbamate | 6 (2.4) | 60 (24.2) |
| Ammonium diethylene-triamine-trisdithiocarbamate | 8 (6.9) | 85 (73.7) |
| Neonicotine phenylene-bisdithiocarbamate | 5 (2.2) | 35 (15.5) |
| Ammonium phenylene-bisdithiocarbamate | 5 (4.4) | 40 (35.1) |
| Neonicotine phenyl-dithiocarbamate | 5 (2.5) | 45 (22.9) |
| Ammonium phenyl-dithiocarbamate | 5 (4.5) | 45 (40.9) |
| Neonicotine piperazine-bisdithiocarbamate | 3 (1.3) | 34 (14.3) |
| Ammonium phenyl-bisdithiocarbamate | 4 (3.5) | 35 (30.6) |
| Nicotine ethylene-bisdithiocarbamate plus ammonium dimethyl-dithiocarbamate | 2 (1.0) | 20 (9.8) |
| Ammonium ethylene-bisdithiocarbamate | 2 (1.7) | 26 (22.4) |
| Nicotine ethylene-bisdithiocarbamate plus neonicotine ethylene-bisdithiocarbamate | 2 (0.8) | 20 (8.1) |
| Ammonium ethylene-bisdithiocarbamate | 2 (1.7) | 26 (22.4) |
| Nicotine ethylene-bisdithiocarbamate plus nicotine phenylene-bisdithiocarbamate | 2 (0.8) | 26 (10.9) |
| Ammonium ethylene-bisdithiocarbamate | 2 (1.7) | 26 (22.4) |
| Nicotine ethylene-bisdithiocarbamate plus ammonium piperazine-bisdithiocarbamate | 2 (1.1) | 20 (11.0) |
| Ammonium ethylene-bisdithiocarbamate | 2 (1.7) | 26 (22.4) |
| Nicotine dimethyl-dithiocarbamate plus sodium phenylene-bisdithiocarbamate | 2 (1.3) | 20 (12.9) |
| Ammonium dimethyl-dithiocarbamate | 2 (1.8) | 26 (22.8) |
| Neonicotine monomethyl-dithiocarbamate plus sodium phenyl-dithiocarbamate | 3 (1.8) | 20 (12.0) |
| Sodium monomethyl-dithiocarbamate | 3 (2.5) | 25 (20.5) |

As will be seen from the above table, the activities of dithiocarbamic acids are highly enhanced by rendering them to nicotine salts or neonicotine salts. For instance, in the case of ethylene-bisdithiocarbamic acid, they have the same effectiveness in one half amount of ammonium type salts by employing them in nicotine salt or neonicotine salt form, hence being very economical. Also, in the cases of blends, wherein more than two classes of agents are blended, they exhibit the same level of effectiveness in one half amount of controls. This is the case with other dithiocarbamates.

In insecticidal tests, controls were prepared by adding 3 g. of sodium salts of fatty acids per one liter of 800-times aqueous solution of aqueous nicotine sulfate solution or aqueous neonicotine sulfate solution (containing 40% of free nicotine or neonicotine) thereto. For the purpose of control tests, 600-times solution of aqueous nicotine sulfate as prepared, were employed. Tests were conducted against Myzus persicae Sulzer (apterous form) infesting egg plants, by measuring the number of the insects alive before and after spraying to determine the mortality. The results are shown in the following table. In this table, concentrations are shown in dilutions to whole solids of nicotine dithiocarbamates or neonicotine dithiocarbamates, and also in dilutions to nicotine portions or neonicotine portions, the latter being shown in parentheses. In the cases of blends, as in the case of bactericidal tests, which were composed of ingredients in 1:1 mol ratio, figures indicated show dilutions to whole solids and also to nicotine portions of neonicotine portions.

| Chemicals | Dilution to whole solids (dilution to nicotine, neonicotine portion) | Mortality |
|---|---|---|
| Nicotine ethylene-bisdithiocarbamate | 1:1200 (1:1978) | 97.5 |
| Nicotine monomethyl-dithiocarbamate | 1:1200 (1:1986) | 99.5 |
| Nicotine dimethyl-dithiocarbamate | 1:1200 (1:2089) | 96.7 |
| Nicotine dithiocarbazate | 1:1200 (1:1993) | 98.5 |
| Nicotine diethylene-triaminetrisdithiocarbamate | 1:1200 (1:2010) | 97.5 |
| Nicotine phenylene-bisdithiocarbamate | 1:1000 (1:1796) | 96.5 |
| Nicotine phenyl-dithiocarbamate | 1:1000 (1:2137) | 97.0 |
| Nicotine piperazine-bisdithiocarbamate | 1:1200 (1:2074) | 98.5 |
| Neonicotine ethylene-bisdithiocarbamate | 1:1200 (1:1978) | 97.2 |
| Neonicotine monomethyl-dithiocarbamate | 1:1200 (1:1986) | 99.2 |
| Neonicotine dimethyl-dithiocarbamate | 1:1200 (1:2089) | 96.5 |
| Neonicotine dithiocarbazate | 1:1200 (1:1993) | 98.1 |
| Neonicotine diethylenetriamine-trisdithiocarbamate | 1:1200 (1:2010) | 97.2 |
| Neonicotine phenylene-bisdithiocarbamate | 1:1000 (1:1796) | 96.5 |
| Neonicotine phenyl-dithiocarbamate | 1:1000 (1:2137) | 97.3 |
| Neonicotine piperazine-bisdithiocarbamate | 1:1200 (1:2074) | 97.9 |
| Nicotine ethylene-bisdithiocarbamate plus ammonium dimethyldithiocarbamate | 1:600 (1:2489) | 93.8 |
| Nicotine ethylene-bisdithiocarbamate plus neonicotine dimethyl-dithiocarbamate | 1:800 (1:2015) | 97.1 |
| Nicotine ethylene-bisdithiocarbamate plus nicotine phenylenebisdithiocarbamate | 1:600 (1:2067) | 97.3 |
| Nicotine ethylene-bisdithiocarbamate plus ammonium piperazine bisdithiocarbamate | 1:800 (1:1990) | 98.1 |
| Nicotine dimethyl-dithiocarbamate plus sodium phenylenebisdithiocarbamate | 1:600 (1:2170) | 97.8 |
| Neonicotine monomethyl-dithiocarbamate plus sodium phenyl-dithiocarbamate | 1:700 (1:1983) | 99.4 |
| Nicotine sulfate plus sodium soap | 1:800 (1:2000) | 92.5 |
| Nicotine sulfate | 1:600 (1:1500) | 89.5 |
| Neonicotine sulfate | 1:600 (1:1500) | 86.5 |

As will be seen from the above table, nicotine and neonicotine dithiocarbamates and blends composed of more than two thereof exhibit very high insecticidal activities when they are diluted and sprayed as diluted, and the activities are far more than those of nicotine and neonicotine sulfate, sprayed as diluted. They are more than equal to those of nicotine sulfate added with sodium soap. This fact shows that they are very high in practical utility.

EXAMPLE 8

50 g. of water is added to 100 g. of 45% nicotine ethylene-bisdithiocarbamate solution which has high viscosity. By the addition of 5 g. of ethyleneglycol to the solution, a lower viscous solution is obtained, then the formulated solution becomes easily dealed with as a pesticide.

EXAMPLE 9

50 g. of water is added to 100 g. of 45% nicotine ethylene-bisdithiocarbamate solution. By the addition of 5 g. of isopropanol to the solution, a lower viscous solution is obtained, then the formulated solution becomes easily dealt with as a pesticide.

EXAMPLE 10

15 g. of nicotine dimethyl-dithiocarbamate which is dried under vacuum (40° C., 5–10 mm. Hg) is mixed with talc and the total weight is adjusted to 100 g. Thus, 15% wettable powder of nicotine dimethyl-dithiocarbamate is obtained.

We claim:
1. A nicotinic alkaloid salt of (a) an acid selected from the group consisting of polydithiocarbamic acid, N-dialkyldithiocarbamic acid, M-mono-alkyl dithiocarbamic acid, N-mono-phenyl dithiocarbamic acid, dithio-carbazic acid and mixtures thereof, wherein each alkyl group has 1 to 3 carbon atoms, with (b) a nicotinic alkaloid selected from the group consisting of nicotine, neonicotine and anabasine.

2. A pesticidal composition comprising a carrier, and an effective amount of at least one nicotinic alkaloid salt of (a) an acid selected from the group consisting of poly dithiocarbamic acid, N-dialkyl dithiocarbamic acid, M-mono-alkyl dithiocarbamic acid, N-mono-phenyl dithiocarbamic acid, dithiocarbazic acid and mixtures thereof, wherein each alkyl group has 1 to 3 carbon atoms, with (b) a nicotinic alkaloid selected from the group consisting of nicotine, neonicotine and anabasine.

3. A pesticidal composition which comprises as an active ingredient, at least one nicotinic alkaloid salt of (a) an acid selected from the group consisting of poly dithiocarbamic acid, N-dialkyl dithiocarbamic acid, N-mono-alkyl dithiocarbamic acid, N-mono-phenyl dithiocarbamic acid, dithiocarbazic acid and mixtures thereof, wherein each alkyl group has 1 to 3 carbon atoms, with (b) a nicotinic alkaloid selected from the group consisting of nicotine, neonicotine and anabasine, and an organic solvent selected from the group consisting of methanol, ethanol, propanol, isopropanol, butanol, isobutanol, amylalcohol, ethyleneglycol, glycerine, acetone, methyl ethyl ketone, dimethyl-formamide and dimethyl-sulfoxide.

4. A pesticidal composition which comprises as an active ingredient, at least one nicotinic alkaloid salt of (a) an acid selected from the group consisting of polydithiocarbamic acid, N-dialkyldithiocarbamic acid, N-mono-alkyl dithiocarbamic acid, N-mono-phenyl dithiocarbamic acid, dithiocarbazic acid and mixtures thereof, wherein each alkyl group has 1 to 3 carbon atoms, with (b) a nicotinic alkaloid selected from the group consisting of nicotine, neonicotine and anabasine, and a solid carrier selected from the group consisting of talc, bentonite and clay.

5. A nicotinic alkaloid salt selected from the group consisting of nicotine ethylene-bisdithiocarbamate, nicotine monomethyl-dithiocarbamate, nicotine dimethyl-dithiocarbamate, nicotine dithiocarbazate, nicotine diethylene-triamine-trisdithiocarbamate, nicotine phenylene-bisdithiocarbamate, nicotine phenyl dithiocarbamate, nicotine piperazine-bisdithiocarbamate, neonicotine ethylene-bisdithiocarbamate, neonicotine monomethyl-dithiocarbamate, neonicotine dimethyl-dithiocarbamate, neonicotine dithiocarbazate, neonicotine diethylene-triamine-trisdithiocarbamate, neonicotine phenylene-bisdithiocarbamate, neonicotine phenyl-dithiocarbamate and neonicotine piperazine-bisdithiocarbamate.

6. A method for controlling bacteria, fungi, insects and nematodes, which comprises contacting the pest to be controlled with an effective amount of at least one nicotinic alkaloid salt of (a) an acid selected from the group consisting of polydithiocarbamic acid, N-dialkyldithiocarbamic acid, M-mono-alkyl dithiocarbamic acid, N-mono-phenyl dithiocarbamic acid, dithiocarbazic acid and mixture thereof, wherein each alkyl group has 1 to 3 carbon atoms, with (b) a nicotinic alkaloid selected from the group consisting of nicotine, neonicotine and anabasine.

References Cited

UNITED STATES PATENTS

| | | | |
|---|---|---|---|
| Re. 22,750 | 4/1946 | Tisdale et al. | 167—22 |
| 2,077,960 | 4/1937 | Sibley | 260—291 X |
| 2,411,253 | 11/1946 | Flenner et al. | 167—22 |
| 2,463,666 | 3/1949 | Woodward et al. | 260—291 |
| 2,466,788 | 4/1949 | Woodward et al. | 167—34 |
| 2,973,297 | 2/1961 | Bakkeren et al. | 167—22 |

OTHER REFERENCES

Levi: Gazz. Chem. Italiana 61:803–814 (1931).

Chabrier et al.: Bull. Societe Chimique de France, pages D–51 to D–65, January–June 1950.

LEWIS GOTTS, *Primary Examiner.*

S. K. ROSE, *Assistant Examiner.*